UNITED STATES PATENT OFFICE.

SPENCER B. NEWBERRY AND HARVEY N. BARRETT, OF BAYBRIDGE, OHIO.

FERTILIZER AND PROCESS OF MAKING SAME.

1,042,588.     Specification of Letters Patent.     Patented Oct. 29, 1912.

No Drawing.     Application filed December 5, 1910. Serial No. 595,573.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Fertilizers and Processes of Making Same, of which the following is a specification.

Our invention relates to the making of citrate soluble phosphatic fertilizer from natural phosphates by heating the natural phosphates with a relatively small amount of alkali metal sulfate.

By natural phosphate we mean phosphate rock, consisting of phosphate of lime or phosphate of alumina and iron, apatite, phosphorite, guano, bone phosphate, or other forms of mineral or animal phosphate in which the phosphoric acid is in a form substantially insoluble in ammonium citrate solution and unavailable, in an untreated condition, for use as fertilizer. By alkali-metal sulfate we mean the normal sulfates of the alkalis, as normal sodium sulfate or normal potassium sulfate.

The amount of alkali metal sulfate required to effect the conversion of the natural phosphate to citrate-soluble condition varies with the purity of the phosphate to be treated, but in the case of sodium sulfate, $Na_2SO_4$, may be generally stated to be an amount of anhydrous sulfate equal to from one-sixth to two-thirds the phosphoric acid contained in the phosphate. If potassium sulfate is used, the quantity required is greater than that of sulfate of soda in the proportion of the equivalent or molecular weights of the two substances, 142 parts by weight of anhydrous sodium sulfate being equivalent to 174 parts of potassium sulfate. A natural phosphate containing 30 per cent. of phosphoric acid, $P_2O_5$, will therefore require the addition of approximately five to twenty per cent. by weight of anhydrous sodium sulfate, or six to twenty-four per cent. of potassium sulfate. We do not wish, however, to be limited to these precise proportions, as good results may be obtained by the use of greater or less amounts of alkali metal sulfate than those stated. An excess of sulfate is not objectionable, except in respect to unnecessary cost, while by employing very high or long-continued heat a good result may be obtained by the use of even a less amount of alkali metal sulfate than the minimum above stated.

In preparing the mixture of phosphate and alkali metal sulfate, the natural phosphate and sulfate are ground together, wet or dry, or separately ground and then mixed, or the sulfate is dissolved in water and the solution mixed with the ground phosphate. The process of calcination is conducted in such manner that the mixture is gradually raised to an orange or white heat, in an oxidizing atmosphere, and maintained at high temperature until the sulfuric acid of the sulfate is practically all expelled as sulfur dioxid and oxygen, which escape with the products of combustion, leaving the calcined product substantially free from sulfates. This liberation of gaseous products has the effect of making the calcined product exceedingly porous and soft, and promotes its solubility. The temperature required varies inversely with the amount of sulfate used, but is generally from 2500° to 2800° F. It is important that during the heating the material shall be continually agitated or turned over to present fresh surfaces to the oxidizing heat. The simplest and most effective apparatus for the production of the conditions described is an internally-fired revolving kiln, as used in making Portland cement, although kilns or furnaces of other types may also be used.

As a practical example of the working of our process, we take ordinary phosphate rock, add five to twenty per cent. anhydrous sulfate of soda or six to twenty-four per cent. of sulfate of potash, and grind to powder. We then introduce the mixture, either dry or with the addition of water, into a rotary kiln similar to a Portland cement kiln, and subject the material, with the constant agitation and exposure of fresh surfaces effected by the revolution of the kiln, to a constantly increasing oxidizing heat, attaining a maximum of probably 2500° to 2800° F. The charge is maintained at maximum heat from one-half hour to one hour, and is continually discharged in the form of soft, porous clinkers. The product is cooled and ground to powder, and is then found to be practically entirely citrate-soluble, and suitable for use as fertilizer or as an ingredient of commercial fertilizers.

The use of sulfate of potash has an advantage over that of sulfate of soda in that potash contained in the product has in itself a great fertilizing effect, and the commercial value of the product is thereby increased. Owing to the higher cost and greater volatility of potash, however, as compared with soda, it is advisable, when potassium sulfate is used, to provide suitable appliances for prevention of loss of alkali, such as dust chambers back of the kiln and water-spray in the stack.

The temperature required is such as will evolve sulfur dioxid from the mixture and the period of high heat is such as will drive off substantially all the sulfur dioxid and the temperatures and times above indicated furnish a good illustration of what is required. The mixture is such and the temperature and period of heating are such that the product, when the process is finished, will not be water soluble but will be citrate soluble.

So far as our process in the preferred form is concerned the result is reached solely by the presence of sulfate in the mixture and the action of heat thereon, and not by the assistance of other re-agents, though such might be present without materially detracting from the process here sought to be covered. Obviously, there can be considerable variation in the temperature and time and quality and quantity of re-agent without departing from the spirit of our invention.

In the specification and claims we have stated that the natural phosphate was heated by a relatively small amount or a small percentage of alkali-metal sulfate. By these terms it will be understood that we mean an amount, for example, of from five to twenty-five per cent. of alkali-metal sulfate, although of course it will be understood that we do not wish to be absolutely limited to these particular percentages, since for certain purposes and conditions, a small per cent. might be less than five per cent. or might even be greater than twenty-five per cent.

We claim:

1. The process of making fertilizer by heating an intimate pulverized mixture of natural phosphate with from five to twenty-four per cent. of alkali metal sulfate, in an oxidizing atmosphere, at a temperature of 2500° F. to 2800° F., until the alkali metal sulfate is substantially decomposed with liberation of sulfur dioxid and oxygen, and the natural phosphate is rendered substantially citrate-soluble.

2. The process of making fertilizer by heating natural phosphate with a small percentage of alkali-metal sulfate, until the sulfate is substantially decomposed with evolution of sulfur dioxid and the natural phosphate changed to citrate-soluble form.

3. The process of making fertilizer by calcining phosphate with a small percentage of alkali-metal sulfate, at nearly white heat until the sulfate is substantially decomposed with evolution of sulfur dioxid and the natural phosphate changed to citrate-soluble form.

4. The process of making fertilizer by calcining natural phosphate with a small percentage of alkali-metal sulfate at nearly white heat in an oxidizing atmosphere until the sulfate is substantially decomposed with evolution of sulfur dioxid and the natural phosphate changed to citrate-soluble form.

5. The process of making fertilizer by calcining natural phosphate of lime with a small percentage of alkali-metal sulfate at nearly white heat in an oxidizing atmosphere until the sulfate is substantially decomposed with evolution of sulfur dioxid and the natural phosphate converted into a citrate-soluble but not water-soluble phosphate.

6. The process of making fertilizer by calcining natural phosphate of lime with alkali-metal sulfate at nearly white heat in an oxidizing atmosphere until the sulfate is substantially decomposed with evolution of sulfur dioxid and the natural phosphate converted into a citrate-soluble but not water-soluble calcium-alkali phosphate substantially free from sulfate.

7. The process of producing a citrate soluble fertilizer which consists in mixing natural phosphate with alkali-metal sulfate, heating the mixture until the sulfate is substantially decomposed, and continuing the heating until approximately all the sulfur dioxid is driven off and the residuum rendered citrate soluble but non-soluble in water.

8. The process of producing a citrate soluble fertilizer which consists in mixing natural phosphate with not to exceed approximately 25% of an alkali-metal sulfate, heating the mixture until the sulfate is substantially decomposed, and continuing the heating until approximately all the sulfur dioxid is driven off and the residuum rendered citrate soluble but non-soluble in water.

9. The process of producing a citrate soluble fertilizer which consists in mixing natural phosphate with alkali-metal sulfate, heating the mixture to approximately from 2500° to 2800° Fahrenheit until the sulfate is substantially decomposed and continuing the heating until approximately all the sulfur dioxid is driven off and the residuum rendered citrate soluble but non-soluble in water.

10. The process of producing a citrate soluble fertilizer which consists in mixing natural phosphate with alkali-metal sulfate, heating the mixture until the sulfate is substantially decomposed and continuing the heating for from 20 minutes to an hour and ten minutes, until approximately all the sulfur dioxid is driven off and the residuum rendered citrate soluble but non-soluble in water.

11. The process of producing a citrate soluble fertilizer which consists in mixing natural phosphate with not more than approximately 25% of alkali-metal sulfate, heating the mixture to from 2500° to 2800° Fahrenheit until the sulfate is substantially decomposed and continuing the heating until approximately all the sulfur dioxid is driven off and the residuum rendered citrate soluble but non-soluble in water.

12. The process of producing a citrate soluble fertilizer, which consists in mixing natural phosphate with less than 25% of alkali-metal sulfate, heating the mixture to approximately 2500° to 2800° Fahrenheit until the sulfate is substantially decomposed and continuing the heating for from 20 minutes to an hour and ten minutes until approximately all the sulfur dioxid is driven off and the residuum rendered citrate soluble but non-soluble in water.

13. The process of producing a citrate soluble fertilizer which consists in mixing natural phosphate with alkali-metal sulfate, heating the mixture to approximately from 2500° to 2800° Fahrenheit until the sulfate is substantially decomposed and continuing the heating for from 20 minutes to an hour and 10 minutes until approximately all the sulfur dioxid is driven off and the residuum rendered citrate soluble but non-soluble in water.

14. A fertilizing material consisting essentially of tri-calcium phosphate combined with one-fourth to one-half equivalent of alkali, the formula of which in the case of soda may vary approximately from $12CaO.Na_2O.4P_2O_5$ to $6CaO.Na_2O.2P_2O_5$.

SPENCER B. NEWBERRY.
HARVEY N. BARRETT.

Witnesses:
  HATTIE M. MEGGITT,
  IRVIN H. NUBER.